(12) United States Patent  (10) Patent No.: US 8,734,550 B1
Sani  (45) Date of Patent: May 27, 2014

(54) POLYCRYSTALLINE DIAMOND COMPACT

(75) Inventor: Mohammad N. Sani, Orem, UT (US)

(73) Assignee: US Synthetic Corporation, Orem, UT (US)

( * ) Notice: Subject to any disclaimer, the term of this patent is extended or adjusted under 35 U.S.C. 154(b) by 756 days.

(21) Appl. No.: 12/912,273

(22) Filed: Oct. 26, 2010

Related U.S. Application Data

(62) Division of application No. 12/111,769, filed on Apr. 29, 2008, now Pat. No. 7,842,111.

(51) Int. Cl.
  *B24D 18/00*  (2006.01)
  *E21B 10/00*  (2006.01)

(52) U.S. Cl.
  USPC ............................................. 51/293; 175/428

(58) Field of Classification Search
  USPC ........ 51/293, 307; 407/119; 175/428; 419/11
  See application file for complete search history.

(56) References Cited

U.S. PATENT DOCUMENTS

| | | | |
|---|---|---|---|
| 3,745,623 A | | 7/1973 | Wentorf, Jr. et al. |
| 4,104,441 A | | 8/1978 | Fedoseev |
| 4,246,005 A | | 1/1981 | Ishizuka |
| 4,268,276 A | | 5/1981 | Bovenkerk |
| 4,274,900 A | | 6/1981 | Mueller et al. |
| 4,410,054 A | | 10/1983 | Nagel et al. |
| 4,425,315 A | * | 1/1984 | Tsuji et al. ............... 423/446 |
| 4,468,138 A | | 8/1984 | Nagel |
| 4,560,014 A | | 12/1985 | Geczy |
| 4,636,253 A | | 1/1987 | Nakai et al. |
| 4,738,322 A | | 4/1988 | Hall et al. |
| 4,797,241 A | | 1/1989 | Peterson et al. |
| 4,811,801 A | | 3/1989 | Salesky et al. |
| 4,913,247 A | | 4/1990 | Jones |
| 5,016,718 A | | 5/1991 | Tandberg |
| 5,087,435 A | | 2/1992 | Potter et al. |
| 5,092,687 A | | 3/1992 | Hall |
| 5,120,327 A | | 6/1992 | Dennis |
| 5,128,080 A | | 7/1992 | Jurewicz |

(Continued)

FOREIGN PATENT DOCUMENTS

| | | |
|---|---|---|
| EP | 0715930 | 6/1996 |
| EP | 07872564.5 | 5/2009 |

(Continued)

OTHER PUBLICATIONS

U.S. Appl. No. 12/111,769, filed Apr. 29, 2008, Sani.

(Continued)

*Primary Examiner* — Pegah Parvini
(74) *Attorney, Agent, or Firm* — Dorsey & Whitney LLP

(57) ABSTRACT

Embodiments of the present invention relate to PDCs including a PCD table having an exterior cutting region that exhibits enhanced thermal stability. In one embodiment, a method comprises forming an assembly including a first region having non-diamond carbon material and a second region having a plurality of diamond particles. The method comprises subjecting the assembly to heat and pressure sufficient to form the PDC. In another embodiment, a PDC comprises a substrate and a PCD table bonded to the substrate. The PCD table comprises an exterior cutting region including a plurality of elongated diamond grains that are generally randomly oriented. The PCD table comprises a main region positioned between the substrate and exterior cutting region, and including a plurality of bonded diamond grains. In another embodiment, the first region may include coarse-sized diamond particles instead of non-diamond carbon material.

20 Claims, 9 Drawing Sheets

(56) References Cited

U.S. PATENT DOCUMENTS

| | | | |
|---|---|---|---|
| 5,135,061 | A | 8/1992 | Newton, Jr. |
| 5,154,245 | A | 10/1992 | Waldenstrom et al. |
| 5,209,916 | A | 5/1993 | Gruen |
| 5,328,676 | A | 7/1994 | Gruen |
| 5,364,192 | A | 11/1994 | Damm et al. |
| 5,368,398 | A | 11/1994 | Damm et al. |
| 5,370,855 | A | 12/1994 | Gruen |
| 5,449,491 | A | 9/1995 | Job |
| 5,460,233 | A | 10/1995 | Meany et al. |
| 5,462,776 | A | 10/1995 | Gruen |
| 5,467,836 | A | 11/1995 | Grimes et al. |
| 5,480,233 | A | 1/1996 | Cunningham |
| 5,544,713 | A | 8/1996 | Dennis |
| 5,620,512 | A | 4/1997 | Gruen et al. |
| 5,759,216 | A | 6/1998 | Kanada et al. |
| 5,900,225 | A | 5/1999 | Mistry et al. |
| 5,954,147 | A | 9/1999 | Overstreet et al. |
| 6,214,079 | B1 | 4/2001 | Kear et al. |
| 6,398,815 | B1 | 6/2002 | Pope et al. |
| 6,544,308 | B2 | 4/2003 | Griffin et al. |
| 6,783,745 | B1 | 8/2004 | Vornov et al. |
| 6,793,681 | B1 | 9/2004 | Pope et al. |
| 6,800,095 | B1 | 10/2004 | Pope et al. |
| 6,883,623 | B2 | 4/2005 | McCormick et al. |
| 7,048,081 | B2 | 5/2006 | Smith et al. |
| 7,060,641 | B2 | 6/2006 | Qian et al. |
| 7,070,635 | B2 | 7/2006 | Frushour |
| 7,350,599 | B2 | 4/2008 | Lockwood et al. |
| 7,516,804 | B2 | 4/2009 | Vail |
| 7,517,588 | B2 | 4/2009 | Frushour |
| 7,569,176 | B2 | 8/2009 | Pope et al. |
| 7,635,035 | B1 | 12/2009 | Bertagnolli |
| 2004/0011433 | A1 | 1/2004 | Shiozaki et al. |
| 2004/0057896 | A1 | 3/2004 | Kronholm et al. |
| 2005/0002851 | A1 | 1/2005 | McElrath et al. |
| 2005/0019114 | A1 | 1/2005 | Sung |
| 2005/0133277 | A1 | 6/2005 | Dixon |
| 2005/0186104 | A1 | 8/2005 | Kear et al. |
| 2005/0227590 | A1 | 10/2005 | Sung |
| 2006/0016127 | A1 | 1/2006 | Sung |
| 2006/0042172 | A1 | 3/2006 | Sung |
| 2006/0060390 | A1 | 3/2006 | Eyre |
| 2006/0060392 | A1 | 3/2006 | Eyre |
| 2006/0086540 | A1 | 4/2006 | Griffin et al. |
| 2006/0147644 | A1 | 7/2006 | Fujimura et al. |
| 2006/0157285 | A1 | 7/2006 | Cannon et al. |
| 2006/0266559 | A1 | 11/2006 | Keshavan et al. |
| 2007/0056778 | A1 | 3/2007 | Webb et al. |
| 2007/0144790 | A1 | 6/2007 | Fang et al. |
| 2007/0187153 | A1 | 8/2007 | Bertagnolli |
| 2007/0189153 | A1 | 8/2007 | Mason |
| 2007/0234646 | A1 | 10/2007 | Can et al. |
| 2007/0272448 | A1 | 11/2007 | Griffo |
| 2008/0085407 | A1 | 4/2008 | Cooley et al. |
| 2008/0115424 | A1 | 5/2008 | Can et al. |
| 2009/0152015 | A1 | 6/2009 | Sani et al. |
| 2009/0158670 | A1 | 6/2009 | Vail |
| 2009/0178345 | A1 | 7/2009 | Russell et al. |
| 2010/0104874 | A1 | 4/2010 | Yong et al. |
| 2013/0269263 | A1 | 10/2013 | Vail |

FOREIGN PATENT DOCUMENTS

| | | |
|---|---|---|
| EP | 07872564.5 | 6/2011 |
| FR | 2684090 | 5/1993 |
| RU | 2131763 | 6/1999 |
| WO | WO99/10274 | 3/1999 |
| WO | WO2008/094190 | 8/2008 |

OTHER PUBLICATIONS

U.S. Appl. No. 12/245,573, filed Oct. 3, 2008, Sani.

Akaishi, Minoru, Yoiciro Sato, Nobuo Setaka, Masayuki Tsutsumi, Toshikazu Ohsawa and Osamu Fukunaga, "Effect of Additive Graphite on Sitering of Diamond", Cermaic Bulletin, vol. 62, No. 6 (1983) pp. 689-694.

Davidenko, V.M, S.V. Kidalov, F.M. Shakhov, M.A. Yagovkina, V.A. Yashin, V.Ya.Vul, "Fullerenes as a co-catalyst for high pressure-high temperature synthesis of diamonds", Diamond and Related Materials 13 (2004) pp. 2203-2206.

Kidalov,S.V., V.I. Sokolov, F.M. Shakhov and A. Ya. Vul', "Mechanism of the Catalytic Effect of Fullerenes on the Graphite-Diamond Phase Transition at High Temperature and Pressure", Doklady Physical Chemistry, vol. 404, Part 1, (2005) pp. 179-181.

Vul, A. Ya, V.M. Davidenko, S.V. Kidalov, S.S. Ordan'Yan and V.A. Yashin, "Fullereness Catalyze the Graphite-Diamond Phase Transition", Technical Physics Letters, vol. 27, No. 5, 2001, pp. 384-386.

Vul, A. Ya, S.V. Kidalov, V.M. Davidenko, V.A. Yashin, S.S. Ordanyan, "Fullerness as a co-catalyst for HPHT Synthesis of Diamond", Proceedings of the Sixth Applied Diamond Conference/Second (2001) pp. 237-238.

Yushin, G.N. et al., "Effect of sintering in structure of nanodiamond," Diamond and Related Materials, Aug. 10, 2005, vol. 14, pp. 1721-1729.

International Search Report and Written Opinion from PCT/US2007/016322.

U.S. Appl. No. 11/496,905, Apr. 17, 2008, Office Action.
U.S. Appl. No. 11/496,905, Oct. 30, 2008, Office Action.
U.S. Appl. No. 11/496,905, Jan. 15, 2009, Notice of Allowance.
U.S. Appl. No. 11/496,905, Apr. 14, 2009, Issue Notification.
U.S. Appl. No. 11/351,564, Sep. 17, 2008, Office Action.
U.S. Appl. No. 11/351,564, Mar. 4, 2009, Office Action.
U.S. Appl. No. 11/351,564, Jun. 24, 2009, Office Action.
U.S. Appl. No. 11/351,564, Dec. 30, 2009, Notice of Allowance.
U.S. Appl. No. 11/351,564, Apr. 15, 2010, Notice of Allowance.
U.S. Appl. No. 11/351,564, Jul. 21, 2010, Notice of Allowance.
U.S. Appl. No. 12/111,769, Dec. 23, 2009, Restriction Requirement.
U.S. Appl. No. 12/111,769, Mar. 11, 2010, Office Action.
U.S. Appl. No. 12/111,769, Jul. 28, 2010, Notice of Allowance.
U.S. Appl. No. 12/111,769, Aug. 20, 2010, Supplemental Notice of Allowability.
U.S. Appl. No. 12/394,594, Oct. 1, 2010, Restriction Requirement.
U.S. Appl. No. 12/909,716, Oct. 21, 2010, Bertagnolli.
U.S. Appl. No. 12/245,573, Oct. 26, 2011, Office Action.
U.S. Appl. No. 13/116,511, Dec. 9, 2011, Office Action.
U.S. Appl. No. 12/394,594, Mar. 31, 2011, Notice of Allowance.
U.S. Appl. No. 13/533,026, filed Jun. 26, 2012, Vail.
Asbury Carbons, "Amorphous Graphite", http://asbury.com/Amourphous-Graphite.html (Mar. 28, 2008) (May 16, 2012) (obtained via Internet Archive Wayback Machine).
U.S. Appl. No. 12/245,573, Jun. 11, 2012, Office Action.
U.S. Appl. No. 13/116,511, Mar. 30, 2012, Notice of Allowance.
U.S. Appl. No. 13/116,511, May 26, 2011, Vail.

Rhede D et al., "Diamond Powder—Containing Moulding Production using Graphite Addition for Improved Mixability and Pressability"-Derwent Account No. 1989-333097, Derwent Week 198946, Copyright 2011 Derwent Information Ltd.-DD 268888 A, dated Jun. 1989.

U.S. Appl. No. 11/351,564, May 27, 2008, Office Action.
U.S. Appl. No. 12/394,594, Jun. 15, 2011, Issue Notification.
U.S. Appl. No. 12/245,573, Jun. 17, 2011, Office Action.
U.S. Appl. No. 11/351,564, Nov. 10, 2010, Issue Notification.
U.S. Appl. No. 12/111,769, Nov. 10, 2010, Issue Notification.
U.S. Appl. No. 12/394,594, Dec. 22, 2010, Office Action.
U.S. Appl. No. 12/909,716, Feb. 14, 2012, Office Action.
U.S. Appl. No. 13/533,026, Dec. 6, 2013, Office Action.
U.S. Appl. No. 12/245,573, Feb. 6, 2014, Office Action.

* cited by examiner

POLYCRYSTALLINE DIAMOND COMPACT

CROSS-REFERENCE TO RELATED APPLICATIONS

This application is a divisional of application Ser. No. 12/111,769 filed 29 Apr. 2008, the disclosure of which is incorporated herein, in its entirety, by this reference.

BACKGROUND

Wear-resistant, superabrasive compacts are utilized in a variety of mechanical applications. For example, polycrystalline diamond compacts ("PDCs") are used in drilling tools (e.g., cutting elements, gage trimmers, etc.), machining equipment, bearing apparatuses, wire-drawing machinery, and in other mechanical apparatuses.

PDCs have found particular utility as superabrasive cutting elements in rotary drill bits, such as roller cone drill bits and fixed cutter drill bits. A PDC cutting element typically includes a superabrasive diamond layer (also known as a diamond table). The diamond table is formed and bonded to a substrate using an ultra-high pressure, ultra-high temperature ("HPHT") process. The substrate is often brazed or otherwise joined to an attachment member, such as a stud or a cylindrical backing. A stud carrying the PDC may be used as a PDC cutting element when mounted to a bit body of a rotary drill bit by press-fitting, brazing, or otherwise securing the stud into a receptacle formed in the bit body. The PDC cutting element may also be brazed directly into a preformed pocket, socket, or other receptacle formed in the bit body. A rotary drill bit typically includes a number of PDC cutting elements affixed to the bit body.

Conventional PDCs are normally fabricated by placing a cemented-carbide substrate into a container or cartridge with a volume of diamond particles positioned on a surface of the cemented-carbide substrate. A number of such cartridges may be loaded into an HPHT press. The substrates and volume of diamond particles are then processed under HPHT conditions in the presence of a catalyst material that causes the diamond particles to bond to one another to form a matrix of bonded diamond grains defining a diamond table. The catalyst material is often a metal-solvent catalyst, such as cobalt, nickel, iron, or alloys thereof that is used for promoting intergrowth of the diamond particles.

In one conventional approach, a constituent of the cemented-carbide substrate, such as cobalt from a cobalt-cemented tungsten carbide substrate, liquefies and sweeps from a region adjacent to the volume of diamond particles into interstitial regions between the diamond particles during the HPHT process. The cobalt acts as a catalyst to promoting intergrowth between the diamond particles, which results in formation of bonded diamond grains. Often, a solvent catalyst may be mixed with the diamond particles prior to subjecting the diamond particles and substrate to the HPHT process.

The solvent catalyst dissolves carbon from the diamond particles or portions of the diamond particles that graphitize due to the high temperature being used in the HPHT process. The solubility of the stable diamond phase in the solvent catalyst is lower than that of the metastable graphite under HPHT conditions. The undersaturated graphite tends to dissolve into solvent catalyst and the supersaturated diamond tends to deposit onto existing diamond particles to form diamond-to-diamond bonds. Accordingly, diamond grains become mutually bonded to form a matrix of polycrystalline diamond with interstitial regions between the bonded diamond grains being occupied by the solvent catalyst.

Despite the availability of a number of different PDC designs, manufacturers and users of PDCs continue to seek PDCs that exhibit improved mechanical properties, thermal properties, or both.

SUMMARY

Embodiments of the present invention relate to PDCs including a PCD table having an exterior cutting region that exhibits enhanced thermal stability and methods of fabricating such PDCs and PCD materials. In one embodiment of the present invention, a method comprises forming an assembly including a first region having non-diamond carbon material and a second region having a plurality of diamond particles. The method further comprises subjecting the assembly to heat and pressure sufficient to form the PDC.

In another embodiment of the present invention, a PDC is disclosed. The PDC comprises a substrate and a PCD table bonded to the substrate. The PCD table comprises an exterior cutting region including a plurality of elongated diamond grains that are generally randomly oriented. The PCD table further comprises a main region positioned between the substrate and exterior cutting region, and including a plurality of bonded diamond grains.

In a further embodiment of the present invention, a method comprises forming an assembly including a first region having coarse-sized diamond particles exhibiting a coarse-sized average particle size and a second region having fine-sized diamond particles exhibiting a fine-sized average particle size. The coarse-sized average particle size may be at least about 5 times that of the fine-sized average particle. The method further comprises subjecting the assembly to heat and pressure sufficient to form a PDC.

In yet another embodiment of the present invention, a PDC is disclosed. The PDC comprises a substrate and a PCD table bonded to the substrate. The PCD table comprises a main region bonded to the substrate and including a first plurality of bonded diamond grains exhibiting a first average grain size. The PCD table further comprises an exterior cutting region exhibiting an enhanced thermal stability relative to the main region and including a second plurality of bonded diamond grains exhibiting a second average grain size that may be about at least 5 times the first average grain size.

Further embodiments of the present invention relate to applications utilizing the disclosed PDCs in various articles and apparatuses, such as rotary drill bits, bearing apparatuses, wire-drawing dies, machining equipment, and other articles and apparatuses.

BRIEF DESCRIPTION OF THE DRAWINGS

The drawings illustrate several embodiments of the present invention, wherein identical reference numerals refer to identical elements or features in different views or embodiments shown in the drawings.

DETAILED DESCRIPTION

Embodiments of the present invention relate to PDCs including a PCD table having an exterior cutting region that exhibits enhanced thermal stability and methods of fabricating such PDCs. For example, in one embodiment of the present invention, the exterior cutting region may be formed by at least partially converting a non-diamond carbon material (e.g., graphite particles, fullerenes, or mixtures thereof) to form PCD including elongated diamond grains. In another embodiment of the present invention, the exterior cutting region may comprise coarse-sized diamond grains that have an average particle size that may be about 5 times or more than that of the diamond grains of a sub-region of the PCD table. The embodiments of PDCs disclosed herein may be used in a variety of applications, such as rotary drill bits, bearing apparatuses, wire-drawing dies, machining equipment, and other articles and apparatuses.

Figure 1:
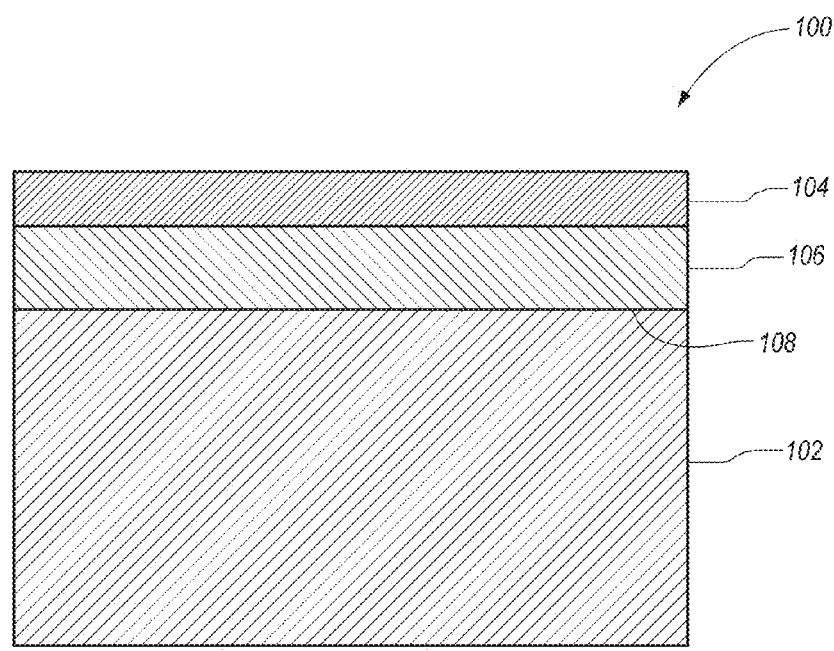
FIG. 1 is an assembly to be HPHT processed including a substrate, a first region including non-diamond carbon material, and a second sub-region including diamond particles positioned therebetween according to an embodiment of the present invention.

FIG. 1 is an assembly 100 to be HPHT processed according to an embodiment of the present invention. The assembly 100 includes a substrate 102, a first region 104 of non-diamond carbon material (e.g., graphite particles, fullerenes, or mixtures thereof), and a second sub-region 106 of diamond particles positioned between the substrate 102 and first region 104 of non-diamond carbon material. The substrate 102 may be generally cylindrical or another selected configuration, without limitation. Although FIG. 1 shows an interfacial surface 108 of the substrate 102 as being substantially planar, the interfacial surface 108 may exhibit a selected non-planar topography, without limitation. The substrate 102 may comprise a cemented-carbide material including a metal-solvent catalyst as a cementing constituent, such as cobalt in cobalt-cemented tungsten carbide or another suitable material. Other materials that may be used for the substrate 102 include, without limitation, cemented carbides including titanium carbide, niobium carbide, tantalum carbide, vanadium carbide, and combinations of any of the preceding carbides cemented with cobalt, iron, nickel, or alloys thereof.

Still referring to FIG. 1, the first region 104 of non-diamond carbon material may comprise one or more layers of particles of non-diamond carbon material, such as one or more layers of graphite particles having, for example, an average size of about 3 μm to about 10 μm, fullerenes, or mixtures thereof. For example, the first region 104 may have a thickness of about 0.010 to about 0.015 inch. One common form of fullerenes comprises 60 carbon atoms arranged in a geodesic dome structure. Such a carbon structure is termed a "Buckminsterfullerene" or "fullerene," although such structures are also sometimes referred to as "buckyballs." Fullerenes are commonly denoted as $C_n$ fullerenes (e.g., n=24, 28, 32, 36, 50, 60, 70, 76, 84, 90, or 94) with "n" corresponding to the number of carbon atoms in the "complete" fullerene structure. Furthermore, elongated fullerene structures may contain millions of carbon atoms, forming a hollow tube-like structure just a few atoms in circumference. These fullerene structures are commonly known as carbon "nanotubes" or "buckytubes" and may have single or multi-walled structures. 99.5% pure $C_{60}$ fullerenes are commercially available from, for example, MER Corporation, of Tucson, Ariz. The second sub-region 106 of diamond particles may comprise one or more layers of diamond particles having any suitable particle size (e.g., about 2 μm to about 40 μm) and any suitable particle size distribution (e.g., normal, log normal, single modal, multi-modal particle size distribution, or combinations diamond particles having the foregoing particle size distributions). For example, the second sub-region 106 may have a thickness of about 0.100 to about 0.150 inch.

Referring still to FIG. 1, the assembly 100 is subjected to an HPHT process to consolidate and at least partially convert the first region 104 of non-diamond carbon material to diamond grains, consolidate and sinter the diamond particles of the second sub-region 106 to form intercrystalline bonded diamond grains, and infiltrate the first region 104 and second sub-region 106 with a metal-solvent catalyst provided from the substrate 102 or another source that promotes sintering of the diamond particles of the second sub-region 106 and promotes converting the non-diamond carbon material of the first region 104. In order to efficiently HPHT process the assembly 100, the assembly 100 may be placed in a pressure transmitting medium, such as a refractory metal can, graphite structure, pyrophyllite and/or other pressure transmitting structure, or another suitable container or supporting element. The pressure transmitting medium, including the assembly 100, is subjected to an HPHT process using an ultra-high pressure press at a temperature of at least about 1000° Celsius (e.g., about 1100° Celsius to about 2200° Celsius) and a pressure of at least about 40 kilobar (e.g., about 50 kilobar to about 80 kilobar) for a time sufficient to infiltrate the first region 104 and second sub-region 106 with the metal-solvent catalyst from the substrate 102, consolidate and at least partially convert the first region 104 of non-diamond carbon material to diamond grains, and consolidate and sinter the diamond particles of the second sub-region 106 to form a PDC 200 shown in FIG. 2.

During the HPHT process, metal-solvent catalyst from the substrate 102 (e.g., cobalt from a cobalt-cemented tungsten carbide substrate) is liquefied and swept into the second sub-region 106 to promote sintering the diamond particles and forming polycrystalline diamond comprising a plurality of bonded diamond grains (i.e., diamond crystals) also known as intercrystalline bonded diamond grains. Metal-solvent catalyst also occupies interstitial regions between the bonded diamond grains. The liquefied metal-solvent catalyst from the substrate 102 also sweeps into the first region 104 of non-diamond carbon material and promotes converting the non-diamond carbon material (e.g., graphite particles, fullerenes, or mixtures thereof) into PCD.

Figure 2:
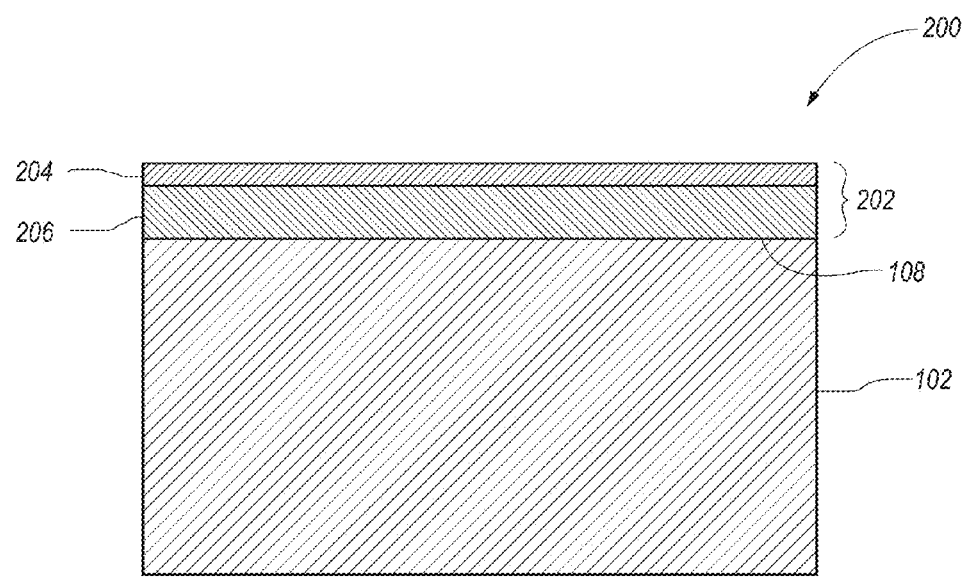
FIG. 2 is a cross-sectional view of a PDC formed by HPHT processing the assembly shown in FIG. 1 according to an embodiment of the present invention.

Referring to FIG. 2, the PDC 200 so-formed from HPHT processing the assembly 100 includes a PCD table 202 bonded to the substrate 102. The PCD table 202 includes an exterior cutting region 204 formed from the precursor first region 104 (FIG. 1) bonded to a main region 206 formed from the precursor second sub-region 108 (FIG. 1). The main region 206 is bonded to the substrate 102. The exterior cutting region 204 may exhibit a thickness of about 0.0050 to about 0.010 inch, and the main region 206 may exhibit a thickness of about 0.075 inch to about 0.150 inch. The amount of metal-solvent catalyst present in the main region 206 is substantially greater than the amount of metal-solvent catalyst present in the exterior cutting region 204. The exterior cutting region 204 may also include residual amounts of un-converted graphite, fullerenes, or both that were present in the precursor first region 104. It is currently believed by the inventor that forming the exterior cutting region 204 by converting a majority of the non-diamond carbon material to diamond grains results in relatively larger diamond grains and relatively less interstitial region volume between such diamond grains than that of the main region 206. The exterior cutting region 204 of the PDC 200, which is subjected to the highest temperature during drilling, exhibits a relatively higher thermal conductivity and relatively higher thermal stability than that of the underlying main region 206 because the amount of metal-solvent catalyst therein is reduced, which may provide a more thermally-stable working region for the PDC 200. In some embodiments, the exterior cutting region 204 may exhibit a relatively higher thermal stability than that of the main region 206.

Figure 3:
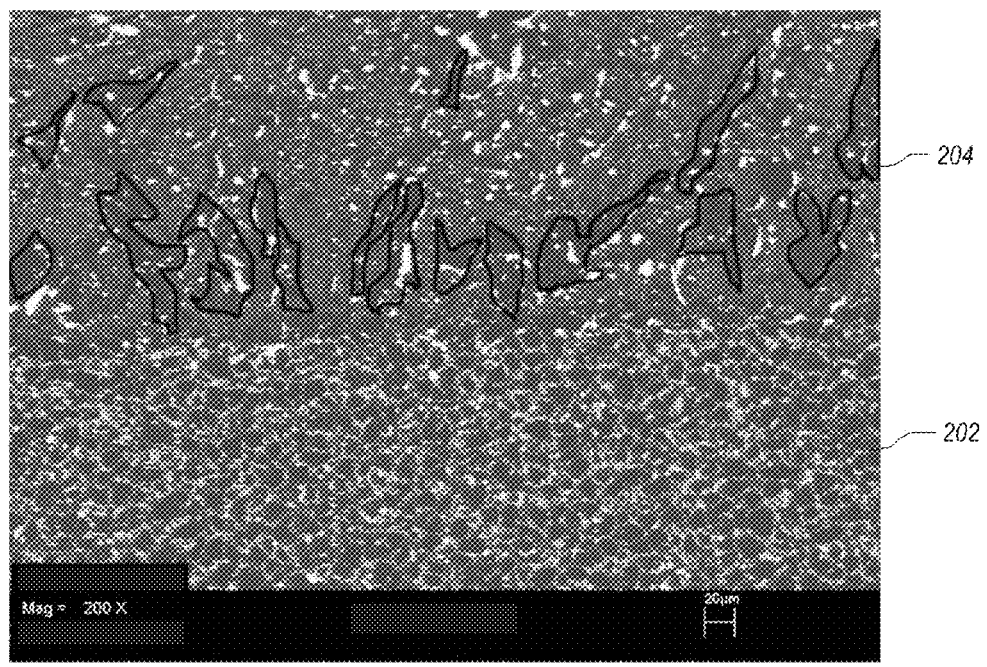
FIG. 3 is a scanning electron microscope ("SEM") photomicrograph of a PCD table of a PDC fabricated in accordance with the teachings of the embodiment shown and described with respect to FIGS. 1 and 2 in which the first region includes a plurality of graphite particles.
Figure 4:
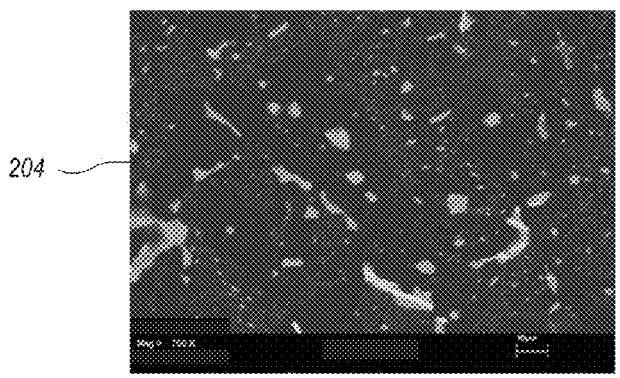
FIG. 4 is a SEM photomicrograph of a portion of the PCD table shown in FIG. 3 resulting from converting a region of graphite particles to PCD.
Figure 5:
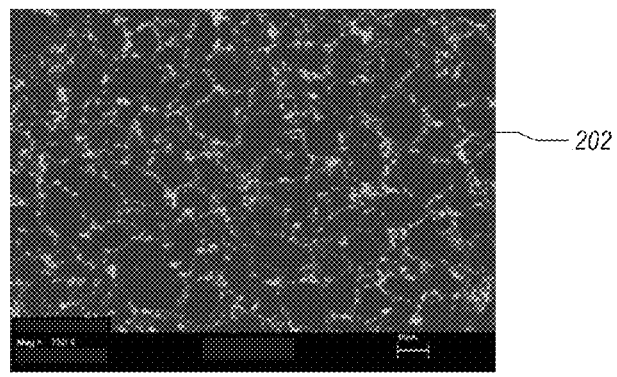
FIG. 5 is a SEM photomicrograph of a portion of the PCD table shown in FIG. 3 resulting from HPHT processing the region of diamond particles to form PCD.

In one embodiment of the present invention, the first region 104 of non-diamond carbon material includes a plurality of graphite particles. FIG. 3 is a SEM photomicrograph of a PCD table of a PDC that was fabricated in accordance with the teachings of the embodiment shown and described with respect to FIGS. 1 and 2 in which the first region 104 includes a plurality of graphite particles. The specific fabrication technique used to form the microstructure of the PDC shown in FIGS. 3-5 will be discussed below in the section on working example 2. Referring to the SEM photomicrograph shown in FIG. 3, in such an embodiment, the exterior cutting region 204 of the PCD table 202 so-formed exhibits a plurality of bonded diamond grains, at least a portion of which are elongated diamond grains and are shown in FIG. 3 outlined in black. The diamond grains between the elongated diamond grains that bridge elongated diamond grains and the diamond grains interspersed with the elongated diamond grains may exhibit a different morphology. There may also be some direct bonding between adjacent elongated diamond grains. Some of the elongated diamond grains may have one or more branch-like portions that extend from a main section. The elongated diamond grains and the other diamond grains form a substantially continuous matrix in which metal-solvent catalyst portions are dispersed therethrough. In contrast to the microstructure of the exterior cutting region 204, the main region 206 resulting from the HPHT sintering of the second sub-region 106 of diamond particles exhibits a microstructure similar to conventional PCD (i.e., a plurality of intercrystalline bonded diamond grains). The main region 206 includes plurality of intercrystalline bonded diamond grains, with the metal-solvent catalyst (cobalt light regions) occupying the interstitial regions between the intercrystalline bonded diamond grains. The exterior cutting region 204 of the PCD table 202 has substantially less of the metal-solvent catalyst (cobalt light regions) than that of the main region 206 and, consequently, may exhibit a higher thermal stability and thermal conductivity than the main region 206. FIG. 4 is a high-magnification SEM image of the exterior cutting region 204 shown in FIG. 3 and FIG. 5 is a high-magnification SEM image of the main region 206 shown in FIG. 3.

In other embodiments of the present invention, the PCD table 202 may be separately formed using an HPHT process and, subsequently, bonded to the interfacial surface 108 of the substrate 102 by brazing, using a separate HPHT bonding process, or any other suitable joining technique, without limitation. For example, metal-solvent catalyst in the form of a green layer of metal-solvent catalyst particles or a solid disk of metal-solvent catalyst may be placed adjacent to the second sub-region 106 as an alternative to providing the metal-solvent catalyst from the substrate 102. In yet another embodiment of the present invention, the second sub-region 106 may include metal-solvent catalyst particles mixed with the diamond particles as an alternative to providing the metal-solvent catalyst from the substrate 102. When the metal-solvent catalyst is provided from a source other than the substrate 102, the substrate 102 may be formed by depositing a binderless carbide (e.g., tungsten carbide) via chemical vapor deposition onto the separately formed PCD table.

Figure 6:
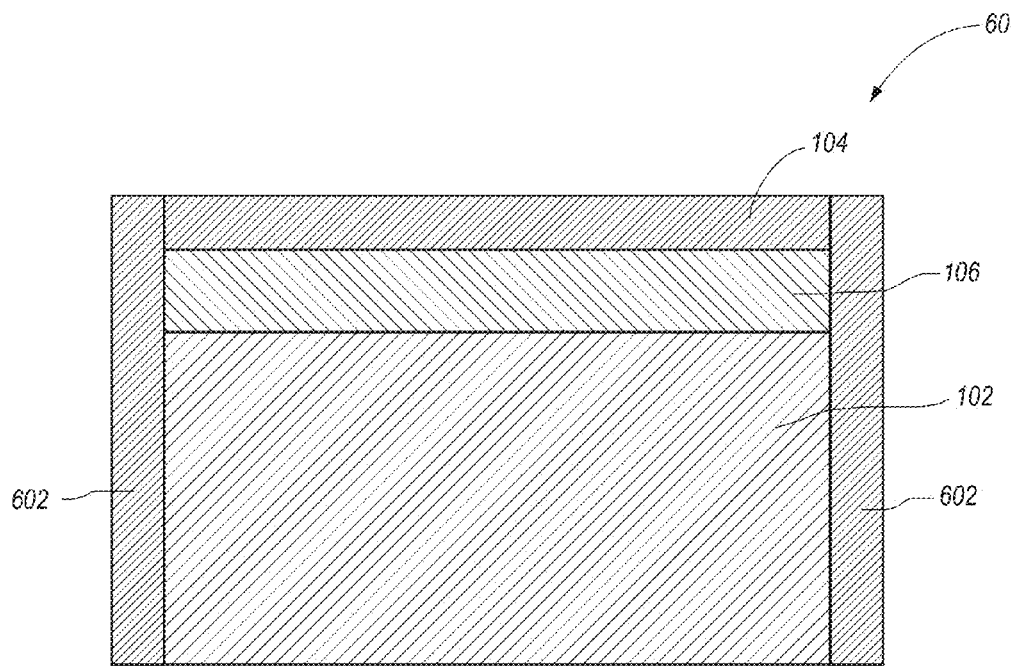
FIG. 6 is an assembly to be HPHT processed including a substrate, a first region including non-diamond carbon material, a second sub-region including diamond particles positioned between the substrate and first region, and a third region of non-diamond carbon material extending about the substrate, first region, and second sub-region according to another embodiment of the present invention.

In some embodiments of the present invention, the PCD region formed by converting non-diamond carbon material may also extend about a lateral periphery of a PDC. Referring to FIG. 6, an assembly 600 to be HPHT processed according to another embodiment of the present invention is depicted. The assembly 600 includes the substrate 102, first region 104, second sub-region 106 positioned between the substrate 102 and first region 104, and a third region 602 of non-diamond carbon material (e.g., graphite particles, fullerenes, or mixtures thereof) extending about the substrate 102, first region 104, and second sub-region 106. For example, according to one embodiment of the present invention, the third region 602 may comprise a green tape including non-diamond carbon particles (e.g., graphite particles, fullerenes, or mixtures thereof) that lines an interior circumferential surface of refractory cylindrical canister (not shown) that holds the assembly 600. The assembly 600 may be subjected to similar or the same HPHT conditions previously discussed with respect to HPHT processing the assembly 100 shown in FIG. 1.

Figure 7:
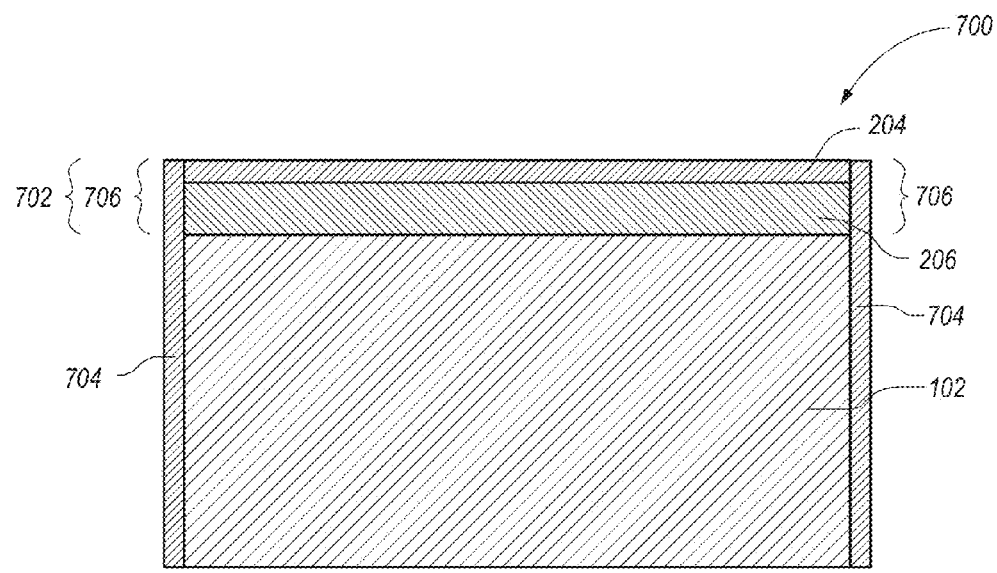
FIG. 7 is a cross-sectional view of a PDC formed by HPHT processing the assembly shown in FIG. 6 according to an embodiment of the present invention.

FIG. 7 is a cross-sectional view of a PDC 700 formed by HPHT processing the assembly 600 shown in FIG. 6 according to an embodiment of the present invention. The PDC 700 includes a PCD table 702 having the exterior cutting region 204 and main region 206 as previously described with respect to FIG. 2. The PDC 700 also includes a peripheral region 704 that is formed by at least partially converting the non-diamond carbon material of the third region 602 (FIG. 6) as a result of the HPHT processing. The PCD table 702 includes a peripheral cutting region 706, which forms part of the peripheral region 704, located adjacent to a lateral periphery of the exterior cutting region 204 and main region 206. The peripheral cutting region 706 extends about a lateral periphery of the exterior cutting region 204 and a portion of or all of the main region 206. The peripheral region 704 has a PCD structure similar to that of the exterior cutting region 204, and in the interest of brevity is not described in detail again. In some embodiments of the present invention, a selected portion of the peripheral region 704 may be removed by grinding or another suitable material removal technique. For example, the portion of the peripheral region 704 adjacent to the substrate 102 may be removed to enable the substrate 102 to be wet by common braze alloys and brazed to a bit body of a rotary drill bit or other structure.

In other embodiments of the present invention, a PCD table may be formed by mixing a selected amount of non-diamond material (e.g., graphite particles, fullerenes, or mixtures thereof) with diamond particles. Referring again to FIG. 1, the first region 104 shown in FIG. 1 may be omitted, and a selected amount of non-diamond material may be mixed with the diamond particles of the second sub-region 106. For example, about 0.1 weight percent to about 10 weight percent of non-diamond material may be mixed with the diamond particles of the second sub-region 106.

Figure 8:
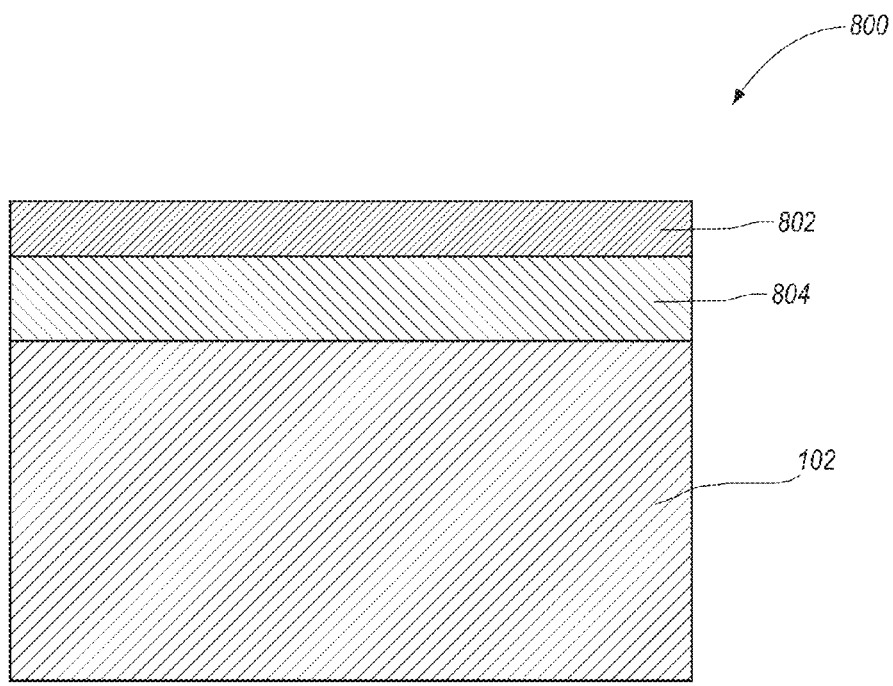
FIG. 8 is an assembly to be HPHT processed including a substrate, a first region including coarse-sized diamond particles, and a second sub-region including fine-sized diamond particles positioned therebetween according to an embodiment of the present invention.

Referring to FIG. 8, in other embodiments of the present invention, a PCD table of a PDC may be formed that exhibits an enhanced thermal stability by using coarse-sized diamond particles instead of non-diamond carbon material. FIG. 8 is an assembly 800 to be HPHT processed according to an embodiment of the present invention. The assembly 800 includes the substrate 102, a first region 802 including one or more layers of coarse-sized diamond particles, and a second sub-region 804 including one or more layers of fine-sized diamond particles positioned therebetween. As used herein, the terms "coarse-sized" and "fine-sized" do not refer to a particular size or size range for the coarse-sized diamond particles and the fine-sized diamond particles. Instead, the terms "coarse-sized" and "fine-sized" refer to relative size differences between the coarse-sized diamond particles of the first region 802 and the fine-sized diamond particles of the second sub-region 804. The coarse-sized diamond particles of the first region 802 exhibit an average particle size (e.g., an average diameter) that may be about 5 times or more than an average particle size of the fine-sized diamond particles of the second sub-region 804. For example, the coarse-sized diamond particles of the first region 802 may exhibit an average particle size of at least about 100 μm (e.g., about 100 μm to about 150 μm), and the fine-sized diamond particles of the second sub-region 804 may exhibit an average particle size of about 10 μm to about 30 μm (e.g., about 18 μm or about 30 μm).

The fine-sized diamond particles of the second sub-region 804 may exhibit one or more selected sizes. For example, in embodiments of the present invention, the fine-sized diamond particles may exhibit a selected size, such size determined, for example, by passing the fine-sized diamond particles through one or more sizing sieve or by any other method. In one embodiment of the present invention, the fine-sized diamond particles may include a relatively larger size and at least one relatively smaller size. As used herein, the phrases "relatively larger" and "relatively smaller" refer to particle sizes (by any suitable method) that differ by at least a factor of two (e.g., 30 μm and 15 μm). More particularly, in various embodiments of the present invention, the fine-sized diamond particles may include a portion exhibiting a relatively larger size (e.g., 30 μm, 20 μm, 15 μm, 12 μm, 10 μm, 8 μm) and another portion exhibiting at least one relatively smaller size (e.g., 6 μm, 5 μm, 4 μm, 3 μm, 2 μm, 1 μm, 0.5 μm, less than 0.5 μm, 0.1 μm, less than 0.1 μm). In another embodiment of the present invention, the fine-sized diamond particles may include a portion exhibiting a relatively larger size between about 30 μm and about 10 μm and another portion exhibiting a relatively smaller size between about 3 μm and 1 μm. Of course, three of more different sizes (e.g., one relatively larger size and two or more relatively smaller sizes) may comprise fine-sized diamond particles, without limitation. One of ordinary skill in the art will appreciate that many suitable variations and combinations are contemplated by the present disclosure.

The assembly 800 shown in FIG. 8 may be subjected to similar or the same HPHT process conditions discussed above with respect to HPHT processing the assembly 100. During HPHT processing, metal-solvent catalyst from the substrate 102 may be liquefied and swept into the second sub-region 804 to promote sintering of the fine-sized diamond particles to form PCD including a plurality of intercrystalline bonded fine-sized diamond grains with the metal-solvent catalyst occupying interstitial regions between adjacent bonded fine-sized diamond grains. The liquefied metal-solvent catalyst from the substrate 102 also sweeps into the first region 802 to promote sintering of the coarse-sized diamond particles to form PCD including a plurality of intercrystalline bonded coarse-sized diamond grains with the metal-solvent catalyst occupying interstitial regions between adjacent bonded coarse-sized diamond grains.

Figure 9:
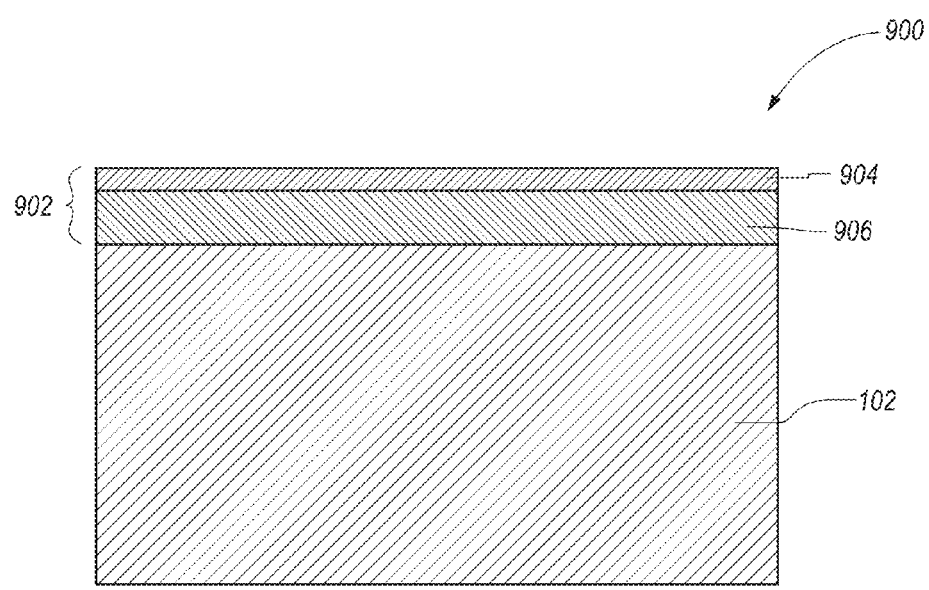
FIG. 9 is a cross-sectional view of a PDC formed by HPHT processing the assembly shown in FIG. 8 according to an embodiment of the present invention.

FIG. 9 is a cross-sectional view of a PDC 900 formed by HPHT processing the assembly 800 shown in FIG. 8 according to an embodiment of the present invention. The PDC 900 includes a PCD table 902 bonded to the substrate 102. The PCD table 902 includes an exterior cutting region 904 formed from HPHT sintering the first region 802 (FIG. 8) and a main region 906 formed from HPHT sintering the second sub-region 804 (FIG. 8). The exterior cutting region 904 includes a plurality of intercrystalline bonded coarse-sized diamond grains and the main region 906 includes a plurality of intercrystalline bonded fine-sized diamond grains. Although the diamond particles of the first region 802 and second sub-region 804 may change due to dissolution of smaller diamond particles in the molten metal-solvent catalyst, fracturing due to the compressive stresses, or both, the average grain size of the coarse-sized diamond grains of the exterior cutting region 904 may be substantially the same as the coarse-sized diamond particles of the first region 802 (FIG. 8) and the average grain size of the fine-sized diamond grains of the main region 906 may be substantially the same as the fine-sized diamond particles of the second sub-region 804 (FIG. 8). The exterior cutting region 904 of the PDC 900, which contacts the subterranean formation during drilling, exhibits a higher thermal conductivity and thermal stability than that of the underlying main region 906 because the amount of metal-solvent catalyst therein is reduced thereby providing a more thermally-stable PDC 900. It is currently believed by the inventor that forming the exterior cutting region 904 by sintering coarse-sized diamond particles results in relatively larger diamond grains and relatively less interstitial region volume between such diamond grains than that of the main region 906. Because the main region 906 does not initially contact the subterranean formation being drilled, it may not exhibit as high of thermal stability as the exterior cutting region 904.

Figure 14:
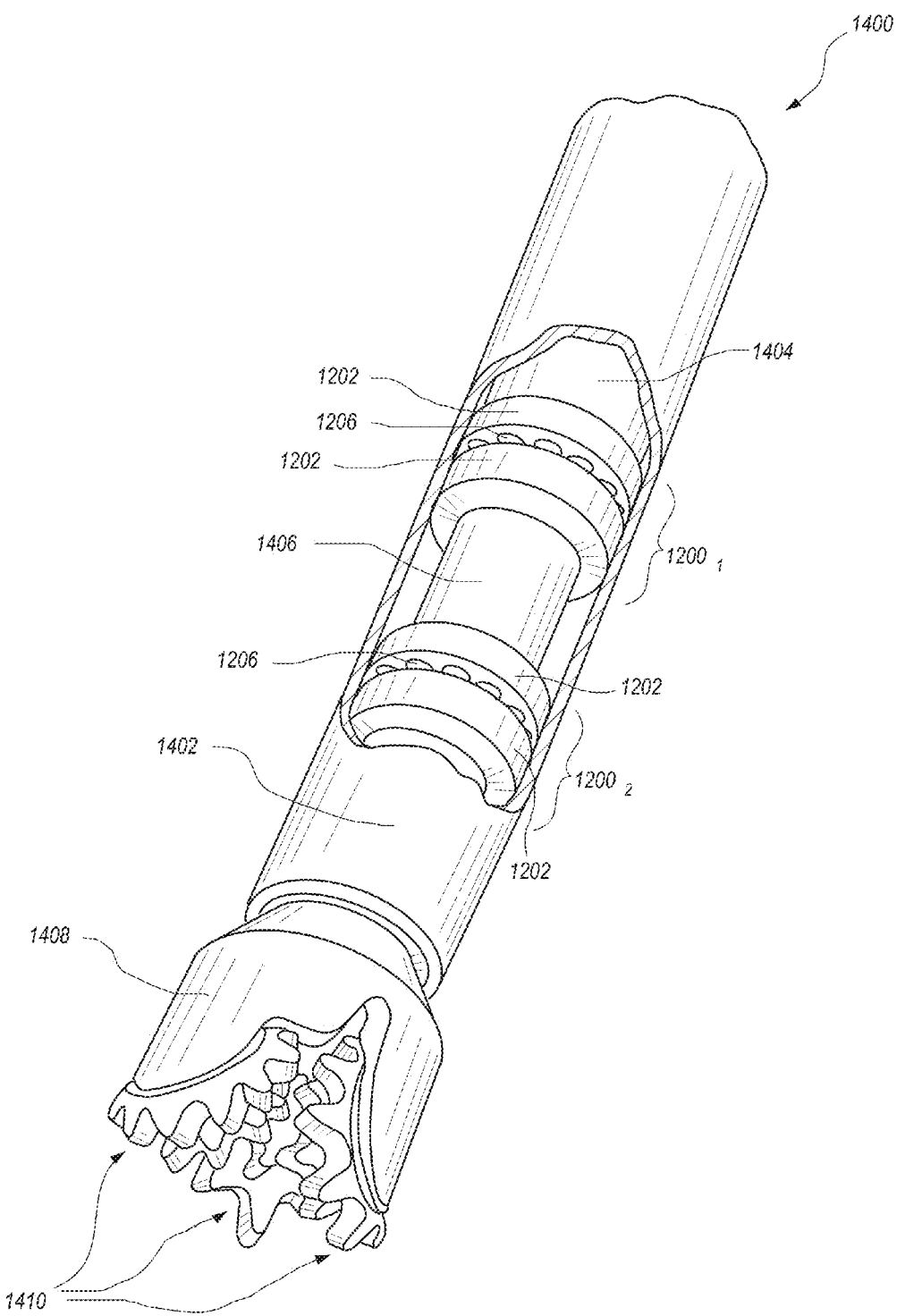
FIG. 14 is a schematic isometric partial cross-sectional view of a subterranean drilling system including the thrust-bearing apparatus shown in FIG. 12 according to another embodiment of the present invention.
Figure 15:
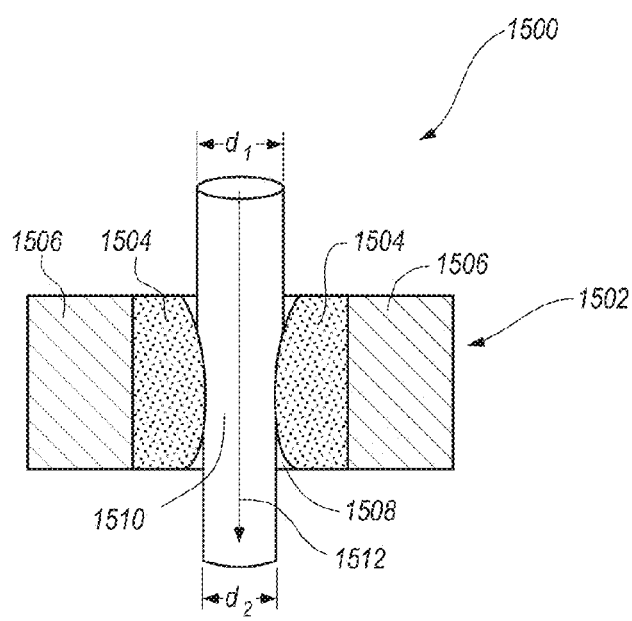
FIG. 15 is a side cross-sectional view of a wire-drawing die according to one embodiment of the present invention that employs a PDC fabricated in accordance with the teachings described herein.

The disclosed PDC embodiments may be used in a number of different applications including, but not limited to, use in a rotary drill bit (FIGS. 10 and 11), a thrust-bearing apparatus (FIG. 12), a radial bearing apparatus (FIG. 13), a subterranean drilling system (FIG. 14), and a wire-drawing die (FIG. 15). It should be emphasized that the various applications discussed above are merely some examples of applications in which the PDC embodiments may be used. Other applications are contemplated, such as employing the disclosed PDC embodiments in friction stir welding tools.

Figure 10:
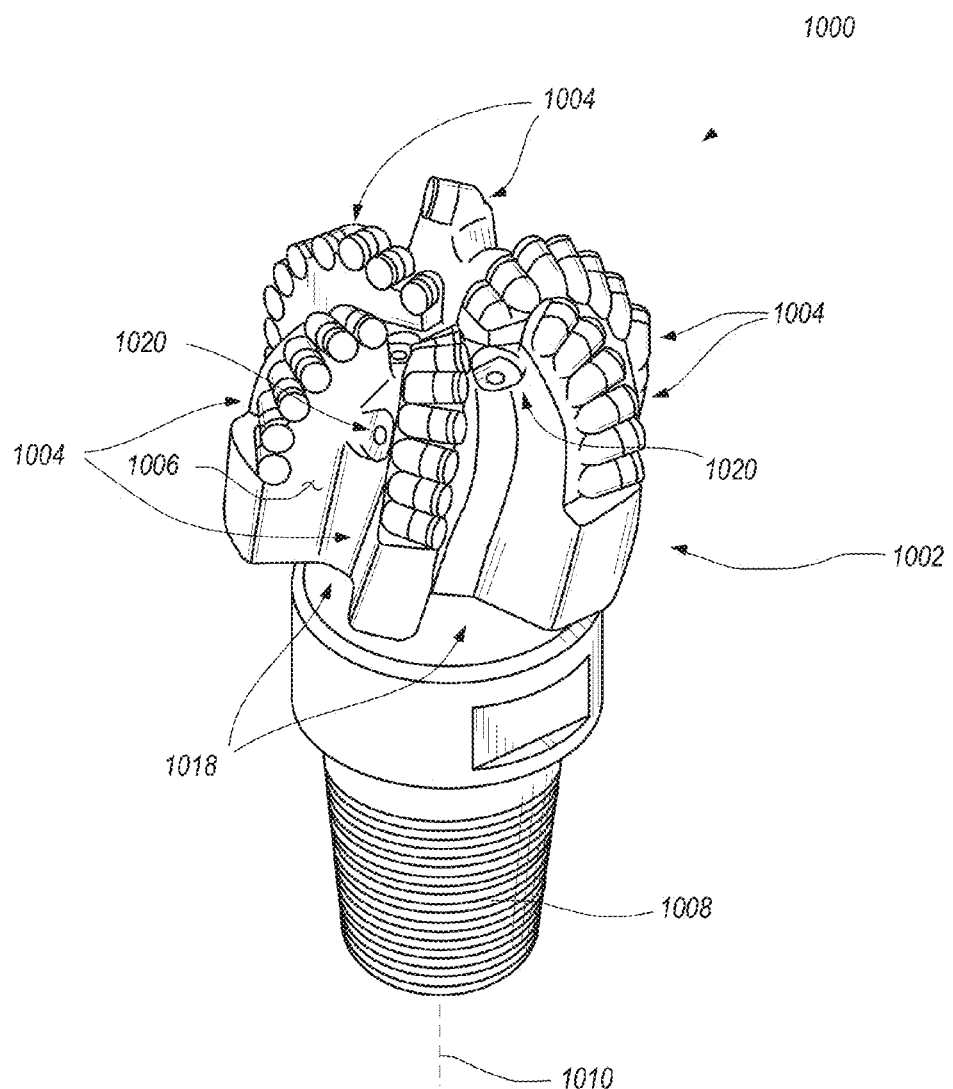
FIG. 10 is an isometric view of a rotary drill bit according to one embodiment of the present invention that may employ one or more of the PDC embodiments of the present invention.
Figure 11:
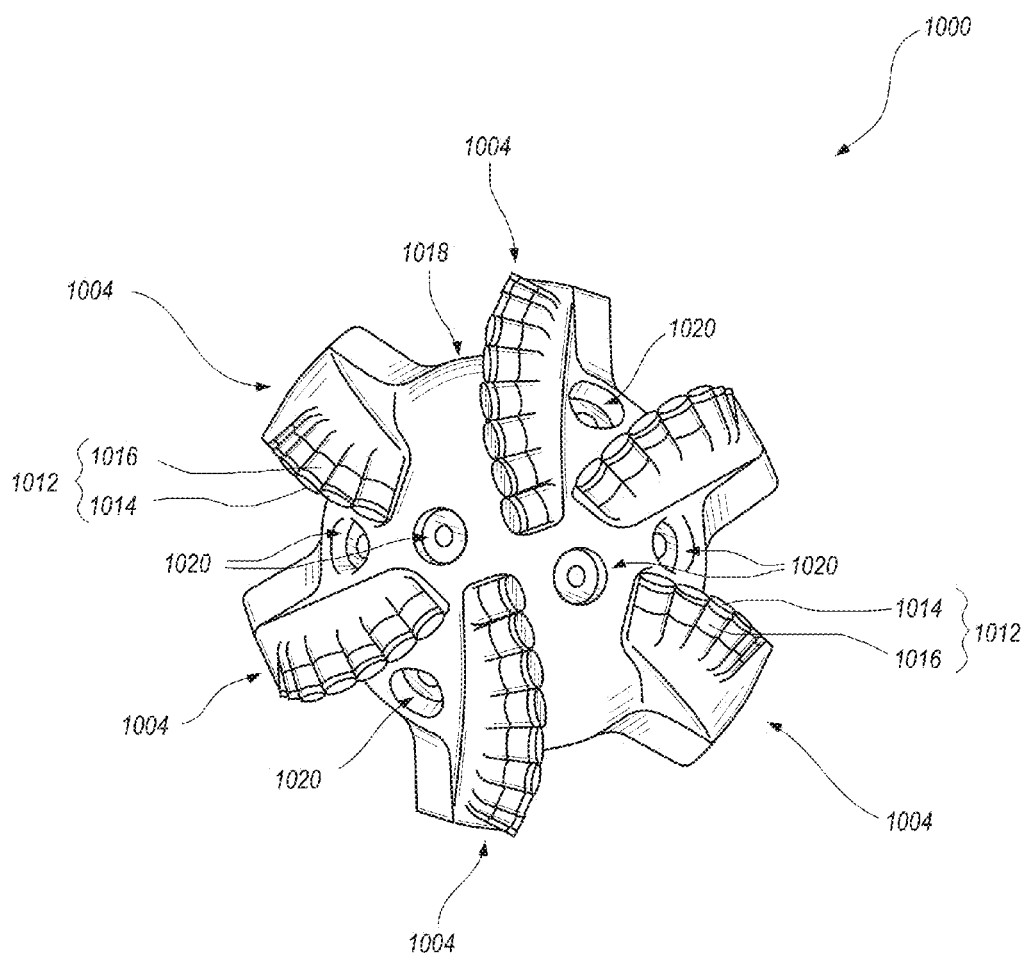
FIG. 11 is a top elevation view of the rotary drill bit shown in FIG. 10.

FIG. 10 is an isometric view and FIG. 11 is a top elevation view of a rotary drill bit 1000 according to one embodiment of the present invention. The rotary drill bit 1000 includes at least one PDC configured according to any of the previously described PDC embodiments. The rotary drill bit 1000 comprises a bit body 1002 that includes radially and longitudinally extending blades 1004 with leading faces 1006, and a threaded pin connection 1008 for connecting the bit body 1002 to a drilling string. The bit body 1002 defines a leading end structure for drilling into a subterranean formation by rotation about a longitudinal axis 1010 and application of weight-on-bit. At least one PDC cutting element, configured according to any of the previously described PDC embodiments (e.g., the PDC 200 shown in FIG. 2), may be affixed to rotary drill bit 1000. With reference to FIG. 11, a plurality of PDCs 1012 are secured to the blades 1004. For example, each PDC 1012 may include a PCD table 1014 bonded to a substrate 1016. More generally, the PDCs 1012 may comprise any PDC disclosed herein, without limitation. In addition, if desired, in some embodiments of the present invention, a number of the PDCs 1012 may be conventional in construction. Also, circumferentially adjacent blades 1004 define so-called junk slots 1018 therebetween, as known in the art. Additionally, the rotary drill bit 1000 includes a plurality of nozzle cavities 1020 for communicating drilling fluid from the interior of the rotary drill bit 1000 to the PDCs 1012.

FIGS. 10 and 11 merely depict one embodiment of a rotary drill bit that employs at least one cutting element that comprises a PDC fabricated and structured in accordance with the disclosed embodiments, without limitation. The rotary drill bit 1000 is used to represent any number of earth-boring tools or drilling tools, including, for example, core bits, roller-cone bits, fixed-cutter bits, eccentric bits, bicenter bits, reamers, reamer wings, or any other downhole tool including PDCs, without limitation.

The PCD materials and/or PDCs disclosed herein (e.g., the PDC 200 shown in FIG. 2) may also be utilized in applications other than rotary drill bits. For example, the disclosed PDC embodiments may be used in thrust-bearing assemblies, radial bearing assemblies, wire-drawing dies, artificial joints, machining elements, and heat sinks.

Figure 12:
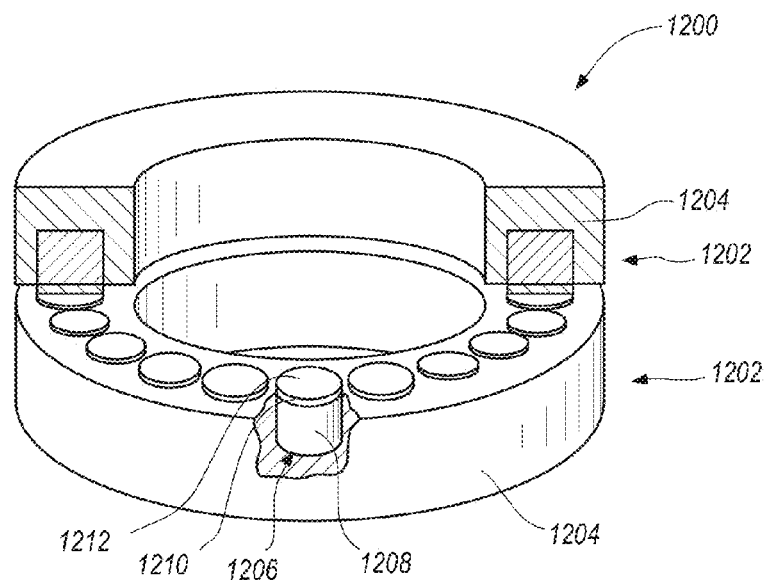
FIG. 12 is an isometric partial cross-sectional view of a thrust-bearing apparatus according to one embodiment of the present invention, which may utilize any of the disclosed PDC embodiments as bearing elements.

FIG. 12 is an isometric partial cross-sectional view of a thrust-bearing apparatus 1200 according to one embodiment of the present invention, which may utilize any of the disclosed PDC embodiments as bearing elements. The thrust-bearing apparatus 1200 includes respective thrust-bearing assemblies 1202. Each thrust-bearing assembly 1202 includes an annular support ring 1204 that may be fabricated from a material, such as carbon steel, stainless steel, or another suitable material. Each support ring 1204 includes a plurality of recesses (not labeled) that receives a corresponding bearing element 1206. Each bearing element 1206 may be mounted to a corresponding support ring 1204 within a corresponding recess by brazing, press-fitting, using fasteners, or another suitable mounting technique. One or more, or all of the bearing elements 1206 may be configured according to any of the disclosed PDC embodiments. For example, each bearing element 1206 may include a substrate 1208 and a PCD table 1210, with the PCD table 1210 including a bearing surface 1212.

In use, the bearing surfaces 1212 of one of the thrust-bearing assemblies 1202 bears against the opposing bearing surfaces 1212 of the other one of the bearing assemblies 1202. For example, one of the thrust-bearing assemblies 1202 may be operably coupled to a shaft to rotate therewith and may be termed a "rotor." The other one of the thrust-bearing assemblies 1202 may be held stationary and may be termed a "stator."

Figure 13:
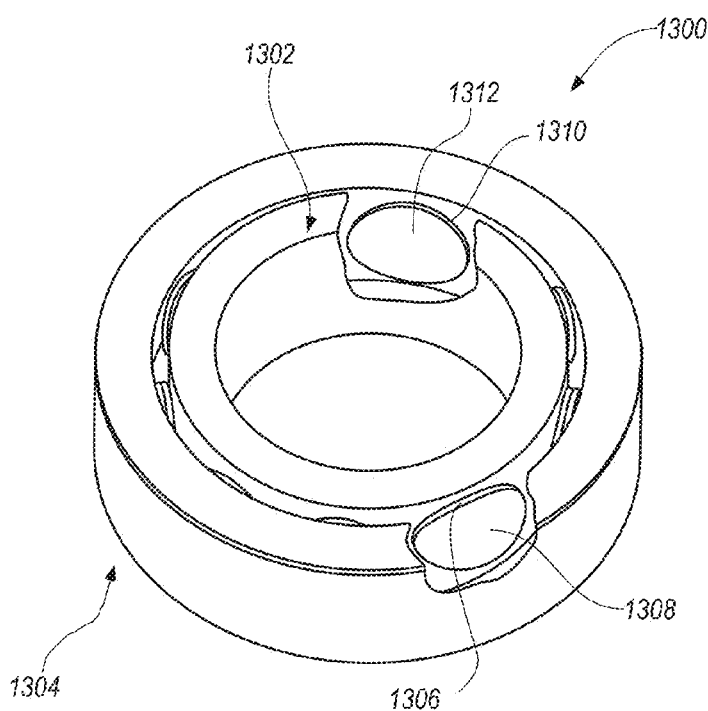
FIG. 13 is an isometric partial cross-sectional view of a radial bearing apparatus according to one embodiment of the present invention, which may utilize any of the disclosed PDC embodiments as bearing elements.

FIG. 13 is an isometric partial cross-sectional view of a radial bearing apparatus 1300 according to another embodiment of the present invention, which may utilize any of the disclosed PDC embodiments as bearing elements. The radial bearing apparatus 1300 includes an inner race 1302 positioned generally within an outer race 1304. The outer race 1304 includes a plurality of bearing elements 1306 affixed thereto that have respective bearing surfaces 1308. The inner race 1302 also includes a plurality of bearing elements 1310 affixed thereto that have respective bearing surfaces 1312. One or more, or all of the bearing elements 1306 and 1310 may be configured according to any of the PDC embodiments disclosed herein. The inner race 1302 is positioned generally within the outer race 1304 and, thus, the inner race 1302 and outer race 1304 may be configured so that the bearing surfaces 1308 and 1312 may at least partially contact one another and move relative to each other as the inner race 1302 and outer race 1304 rotate relative to each other during use.

The radial-bearing apparatus 1300 may be employed in a variety of mechanical applications. For example, so-called "roller cone" rotary drill bits may benefit from a radial-bearing apparatus disclosed herein. More specifically, the inner race 1302 may be mounted or affixed to a spindle of a roller cone and the outer race 1304 may be affixed to an inner bore formed within a cone and that such an outer race 1304 and inner race 1302 may be assembled to form a radial-bearing apparatus.

Referring to FIG. 14, the thrust-bearing apparatus 1200 and/or radial bearing apparatus 1300 may be incorporated in a subterranean drilling system. FIG. 14 is a schematic isometric partial cross-sectional view of a subterranean drilling system 1400 that includes at least one of the thrust-bearing apparatuses 1200 shown in FIG. 12 according to another embodiment of the present invention. The subterranean drilling system 1400 includes a housing 1402 enclosing a downhole drilling motor 1404 (i.e., a motor, turbine, or any other device capable of rotating an output shaft) that is operably connected to an output shaft 1406. A first thrust-bearing apparatus $1200_1$ (FIG. 12) is operably coupled to the downhole drilling motor 1404. A second thrust-bearing apparatuses $1200_2$ (FIG. 12) is operably coupled to the output shaft 1406. A rotary drill bit 1408 configured to engage a subterranean formation and drill a borehole is connected to the output shaft 1406. The rotary drill bit 1408 is shown as a roller cone bit including a plurality of roller cones 1410. However, other embodiments of the present invention may utilize different types of rotary drill bits, such as a so-called "fixed cutter" drill bit shown in FIGS. 10 and 11. As the borehole is drilled, pipe sections may be connected to the subterranean drilling system 1400 to form a drill string capable of progressively drilling the borehole to a greater depth within the earth.

One of the thrust-bearing assemblies 1202 of the thrust-bearing apparatuses $1200_1$ and $1200_2$ is configured as a stator that does not rotate and the other one of the thrust-bearing assemblies 1202 is configured as a rotor that is attached to the output shaft 1406 and rotates with the output shaft 1406. The on-bottom thrust generated when the drill bit 1408 engages the bottom of the borehole may be carried, at least in part, by the first thrust-bearing apparatus $1200_1$. Fluid flow through the power section of the downhole drilling motor 1404 may cause what is commonly referred to as "off-bottom thrust," which may be carried, at least in part, by the second thrust-bearing apparatus $1200_2$.

In operation, drilling fluid may be circulated through the downhole drilling motor 1404 to generate torque and effect rotation of the output shaft 1406 and the rotary drill bit 1408 attached thereto so that a borehole may be drilled. A portion of the drilling fluid may also be used to lubricate opposing bearing surfaces of the bearing elements 1206 of the thrust-bearing assemblies 1202.

FIG. 15 is a side cross-sectional view of a wire-drawing die 1500 according to one embodiment of the present invention that employs a PDC 1502 fabricated in accordance with the teachings described herein. The PDC 1502 includes an inner, annular PCD region 1504 comprising any of the PCD tables described herein that is bonded to an outer cylindrical substrate 1506 that may be made from the same materials as the substrate 102 shown in FIG. 1. The PCD region 1504 also includes a die cavity 1508 formed therethrough configured for receiving and shaping a wire being drawn. The wire-drawing die 1500 may be encased in a housing (e.g., a stainless steel housing), which is not shown, to allow for handling.

In use, a wire 1510 of a diameter d1 is drawn through die cavity 1508 along a wire drawing axis 1512 to reduce the diameter of the wire 1510 to a reduced diameter $d_2$.

The following working example of the present invention sets forth one example of a method of fabricating a PDC and the PDC so-formed. The following working example provides further detail in connection with the specific embodiments described above.

Comparative Working Example 1

A conventional PDC was formed from a mixture of diamond particles having an average grain size of about 18 μm. The mixture was placed adjacent to a cobalt-cemented tungsten carbide substrate. The mixture and substrate were placed in a niobium can and HPHT sintered at a temperature of about 1400° Celsius and a pressure of about 5 GPa to about 8 GPa for about 90 seconds to form the conventional PDC. The conventional PDC was acid-leached to a depth of about 70 μm to remove substantially all of the cobalt from a region of the polycrystalline diamond table. The thickness of the polycrystalline diamond table of the PDC was 0.090 inches and a 0.012 inch chamfer was machined in the polycrystalline diamond table. The thermal stability of the conventional PDC so-formed was evaluated by measuring the distance cut in a Sierra White granite workpiece prior to failure without using coolant in a vertical turret lathe test. The distance cut is considered representative of the thermal stability of the PDC. The conventional PDC was able to cut a distance of about only 2500 linear feet in the workpiece prior to failure.

Working Example 2

A PDC according to an embodiment of the present invention was fabricated. A layer of graphite particles having an average particle size of about 3 μm were placed in a niobium can. A layer of diamond particles having an average particle size of about 18 μm were placed on top of the layer of graphite particles. A cobalt-cemented tungsten carbide substrate was placed on top of the layer of diamond particles. The graphite particles, diamond particles, and substrate placed in the niobium can were vacuum sealed therein. The niobium can (including the graphite particles, diamond particles, and substrate therein) was subjected to HPHT conditions at a temperature of about 1380° Celsius and a pressure of about 5 GPa to about 8 GPa for about 90 seconds to form the PDC. The thickness of the PCD table of the PDC was 0.080 inch and a 0.012 inch chamfer was machined in the PCD table.

The microstructure of the PCD table is shown in FIGS. 3-5. The exterior cutting region 204 of the PCD table 202 so-formed exhibits a plurality of bonded diamond grains, at least a portion of which are elongated diamond grains and are shown in FIG. 3 outlined in black. The diamond grains between the elongated diamond grains that bridge elongated diamond grains exhibit a different morphology. Some of the elongated diamond grains may have one or more branch-like portions that extend from a main section. The elongated diamond grains and the other diamond grains form a substantially continuous matrix in which cobalt portions swept in from the substrate are dispersed therethrough. The main region 206 resulting from the HPHT sintering of the diamond particles exhibits a microstructure similar to conventional PCD (i.e., a plurality of intercrystalline bonded diamond grains). The main region 206 includes plurality of intercrystalline bonded diamond grains, with cobalt (light regions) occupying the interstitial regions between the intercrystalline bonded diamond grains. The exterior cutting region 204 of the PCD table 202 has substantially less of cobalt (light regions) than that of the main region 206. FIG. 4 is a high-magnification SEM image of the exterior cutting region 204 shown in FIG. 3 and FIG. 5 is a high-magnification SEM image of the main region 206 shown in FIG. 3.

The thermal stability of the PDC so-formed was evaluated by measuring the distance cut in a Sierra White granite workpiece prior to failure without using coolant in a vertical turret lathe test. The PDC of working example 2 was able to cut a distance of about 3300 linear feet in the workpiece prior to failure, which is approximately 1.3 times the distance that the comparative working example 1 was able to cut indicating that the PDC of working example 2 exhibited an enhanced thermal stability despite the presence of cobalt (bright regions) in the exterior cutting region 204 (FIGS. 3-5).

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall have the same meaning as the word "comprising" and variants thereof (e.g., "comprise" and "comprises") and mean "including, but not limited to."

What is claimed is:
1. A polycrystalline diamond compact ("PDC"), comprising:
  a substrate; and
  a polycrystalline diamond table bonded to the substrate and including:
    an exterior cutting region including a plurality of elongated diamond grains that are generally randomly oriented; and
    a main region positioned between the substrate and the exterior cutting region, and including a plurality of bonded diamond grains.

2. The PDC of claim 1 wherein the exterior cutting region comprises metal-solvent catalyst regions embedded within a substantially continuous matrix including the elongated diamond grains.

3. The PDC of claim 1 wherein the exterior cutting region includes a plurality of non-elongated diamond grains interspersed with the plurality of elongated diamond grains.

4. The PDC of claim 1 wherein:
the exterior cutting region comprises a first amount of metal-solvent catalyst; and
the main region comprises a second amount of metal-solvent catalyst that is greater than that of the first amount in the exterior cutting region.

5. The PDC of claim 4 wherein the metal-solvent catalyst in the main region and the cutting region comprises cobalt, iron, nickel, or alloys thereof.

6. The PDC of claim 1 wherein the exterior cutting region comprises at least one of a residual amount of fullerenes or a residual amount of graphite.

7. The PDC of claim 1 wherein the exterior cutting region exhibits a thermal conductivity that is greater than a thermal conductivity of the main region.

8. A rotary drill bit comprising a bit body including a leading end having generally radially extending blades configured to facilitate drilling a subterranean formation, and a plurality cutting elements mounted to the blades, at least one of the cutting elements configured as the PDC of claim 1.

9. A polycrystalline diamond compact ("PDC"), comprising:
a substrate; and
a polycrystalline diamond table bonded to the substrate and including:
an annular region including a plurality of elongated diamond grains that are generally randomly oriented; and
a main region positioned adjacent to the substrate and the annular region, and including a plurality of bonded diamond grains, the main region exhibiting a greater amount of metal-solvent catalyst than that of the annular region.

10. The PDC of claim 9 wherein the annular region comprises a plurality of non-elongated diamond grains interspersed with the plurality of elongated diamond grains.

11. A polycrystalline diamond compact ("PDC"), comprising:
a substrate; and
a polycrystalline diamond table bonded to the substrate and including:
a main region bonded to the substrate and including a first plurality of bonded diamond grains exhibiting a first average grain size; and
an exterior cutting region exhibiting an enhanced thermal stability relative to the main region and including a second plurality of bonded diamond grains exhibiting a second average grain size that is at least about 5 times the first average grain size.

12. The PDC of claim 11 wherein:
the main region comprises a first amount of metal-solvent catalyst; and
the exterior cutting region comprises a second amount of metal-solvent catalyst that is less than that of the first amount in the main region.

13. The PDC of claim 12 wherein the metal-solvent catalyst in the main region and the cutting region comprises cobalt, iron, nickel, or alloys thereof.

14. The PDC of claim 11 wherein the exterior cutting region comprises metal-solvent catalyst regions embedded within a substantially continuous matrix defined by the second plurality of bonded diamond grains.

15. The PDC of claim 11 wherein the exterior cutting region exhibits a thermal conductivity that is greater than a thermal conductivity of the main region.

16. The PDC of claim 11 wherein the substrate comprises a cemented carbide substrate.

17. A rotary drill bit comprising a bit body including a leading end having generally radially extending blades configured to facilitate drilling a subterranean formation, and a plurality cutting elements mounted to the blades, at least one of the cutting elements configured as the PDC of claim 11.

18. A polycrystalline diamond compact ("PDC"), comprising:
a substrate; and
a polycrystalline diamond table bonded to the substrate and including:
a main region bonded to the substrate and including a first plurality of bonded diamond grains exhibiting a first average grain size, the main region including a first amount of metal-solvent catalyst; and
an exterior cutting region including a second plurality of bonded diamond grains exhibiting a second average grain size that is at least about 5 times the first average grain size, the exterior cutting region exhibiting a second amount of metal-solvent catalyst that is less than that of the first amount in the main region.

19. The PDC of claim 18 wherein first average grain size is about 10 μm to about 30 μm, and the second average grain size is at least about 100 μm.

20. The PDC of claim 18 wherein first average grain size is about 18 μm to about 30 μm, and the second average grain size is about 100 μm to about 150 μm.

\* \* \* \* \*